United States Patent
Nakamura et al.

(10) Patent No.: US 6,538,717 B2
(45) Date of Patent: *Mar. 25, 2003

(54) METHOD OF IMAGE READING BY ONE TIME TO-AND-FRO SCANNING

(75) Inventors: Hiroaki Nakamura, Kanagawa (JP); Teruo Takanashi, Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,608

(22) Filed: Jan. 26, 1999

(65) Prior Publication Data

US 2002/0075465 A1 Jun. 20, 2002

(30) Foreign Application Priority Data

Jan. 26, 1998 (JP) ............................................. 10-012493

(51) Int. Cl.⁷ ........................... G03B 27/52; G03B 29/00
(52) U.S. Cl. ............................... 355/40; 355/41; 355/28
(58) Field of Search ............................. 355/28, 29, 40, 355/41, 42, 75, 82; 348/96, 98, 97

(56) References Cited

U.S. PATENT DOCUMENTS

| 5,565,912 A | * 10/1996 | Easterly et al. ................ 348/96 |
| 5,850,253 A | * 12/1998 | Inoue et al. .................. 348/96 |
| 5,933,186 A | * 8/1999 | Ikari et al. .................... 348/97 |
| 5,940,169 A | * 8/1999 | Masutani ..................... 355/40 |
| 5,949,479 A | * 9/1999 | Maruyama et al. ........... 348/97 |
| 5,991,010 A | * 11/1999 | Nishio ......................... 355/82 |
| 6,118,477 A |   9/2000 | Maruyama et al. |

FOREIGN PATENT DOCUMENTS

| JP | 08-340400 A | 12/1996 |
| JP | 09-037005 A | 2/1997 |
| WO | WO 96/25004 A1 | 8/1996 |

* cited by examiner

*Primary Examiner*—Russell Adams
*Assistant Examiner*—Peter B. Kim
(74) *Attorney, Agent, or Firm*—Birch, Stewart, Kolasch & Birch, LLP (57) ABSTRACT

The image reading method comprises the steps of scanning an original in a direction of arrangement of original images to read the original images by pre-scanning; setting up image processing conditions of the read images in a reverse order to a pre-scanning order; processing the read images based on the image processing conditions; displaying the processed images: subjecting the displayed images to image verification in the reverse order; and scanning to original in the reverse direction to the pre-scanning direction to read the original images by main scanning as a result of the image verification.

The image reading method is capable of reading the original images recorded on a film or the like, wherein each step of pre-scanning, verification and main scanning is efficiently performed and, when a digital photoprinter or the like is utilized, prints of good quality are outputted constantly with a high productivity.

26 Claims, 6 Drawing Sheets

METHOD OF IMAGE READING BY ONE TIME TO-AND-FRO SCANNING

BACKGROUND OF THE INVENTION

The present invention relates to a technical field of image reading methods applied for digital photoprinters and the like for photoelectrically reading images photographed on films to obtain finished prints (photographs) that are reproduced from the images.

Images recorded on photographic films (hereinafter called "films") such as negative films, reversal films and the like are mainly printed out on photosensitive materials (photographic paper) by projecting on-film images onto the photosensitive materials so that the photosensitive materials are subjected to surface exposure or so-called direct exposure (analog exposure).

On the other hand, printing apparatus utilizing digital exposure have been put to practical use in recent years. More specifically, a digital photoprinter is used for printing out (finishing off) an image recorded on a film through the steps of reading the image photoelectrically, converting the readout image into a digital signal, performing various kinds of image processing in order to obtain image data to be recorded and subjecting a photosensitive material to scanning exposure by means of a recording light modulated according to the image data, whereby to record the image (latent image).

As exposure conditions at the time of printing may be determined by processing images with digital data as image data in the digital photoprinter, high-grade prints that have been unavailable until now come to be obtainable by such as making correction for image fade-out and improper gradation such as washed-out highlight and dull shadow originating from backlight, electronic flashing and the like, sharpness processing, correction for color or density failure. Moreover, a composite photograph using a plurality of images, image division, a composition of characters and the like may be attained by processing the image data. Image data processing also makes it possible to output prints edited/processed freely in accordance with an intended use.

Furthermore, the digital photoprinter makes image data applicable for other purposes than photography, since the photoprinter allows images to be outputted as prints (photographs) and also allows the image data to be not only supplied to a computer, for example, but also stored in optical and/or magnetic recording media such as floppy disks.

Such digital photoprinter as described above essentially comprises an image input apparatus having a scanner (image reading apparatus) and an image-processing apparatus, and an image output apparatus having a printer (image recording apparatus) and a processor(developing apparatus).

The operation of the scanner includes making read light emitted from a light source incident on a film to obtain projected light for carrying an image projected on the film, effecting image formation in an image sensor such as a charge coupled device (CCD) by means of an image forming lens so as to read the image by subjecting the projected light to photoelectric conversion, performing various kinds of image processing as the occasion demands and sending data concerning the on-film image (image data signal) to the image-processing apparatus.

The operation of the image-processing apparatus includes setting image processing conditions according to the image data read by the scanner, applying image processing corresponding to the set conditions to the image data and sending output image recording data (exposure conditions) to the printer.

The operation of the printer, that is, a printer utilizing light beam scanning exposure, for example, includes modulating a light beam according to the image data sent from the image-processing apparatus, deflecting the light beam in a main scanning direction, transporting the photosensitive material in an auxiliary-scanning direction perpendicular to the main scanning direction in order to form a latent image by exposing (printing) the photosensitive material using the light beam that carries the image therewith and performing developing processing suitable for the photosensitive material in the processor in order to make a print (photograph) reproduced from the on-film image.

Images are usually photographed in a plurality of frames on a film. At a scanner in a digital photoprinter, the film is transported in a longitudinal direction of the film by a film carrier so as to bring the frames to a readout position to allow images of all frames to be read.

Reading an image of a frame has usually been done by two scanning operations: pre-scanning which reads the image with a low resolution (pixel density); and main scanning which reads the image to obtain image data for outputting. The pre-scanning is done so as to collect image data to be utilized for establishing image reading conditions and image processing conditions for the main scanning. The main scanning is performed according to these image reading conditions. Image data obtained by the main scanning is then processed under the newly established image processing conditions in order to obtain image data for outputting.

When a print is made, an operator's check of an image, that is, a verification , has usually been performed. The verification is done in following steps. First, image processing conditions are determined. Second, image (data) obtained by pre-scanning is processed according to the image processing conditions. Third, processed image (data) is displayed on a display as a simulation image. Finally, the operator makes an adjustment on color and/or density as the need arises looking at the simulation image. In this manner, the image processing conditions are adjusted.

In order to materialize a high productivity by preparing prints efficiently, it is important that an operation and processing at each stage of pre-scanning, verification and main scanning of a number of frames should be efficiently performed.

SUMMARY OF THE INVENTION

Accordingly, it is an object of the present invention to provide an image reading method which is capable of reading images on an original such as a film and the like recorded with a plurality of original images, while performing efficiently each step of pre-scanning, verification and main scanning, and preparing prints with a high productivity by employing a digital photoprinter and the like, with regard to readout of the images of a number of frames.

To achieve the above object, the present invention to provides an image reading method of reading an original image on an original wherein original images recorded in a plurality of frames arranged in a direction, respectively, comprising the steps of scanning said original in the direction of arrangement of the original images to perform pre-scanning for reading the original image recorded on said original successively; after the pre-scanning of all of the original images recorded on the original, setting up image processing conditions of each read original image in a reverse order to an image reading order of the pre-scanning; processing each read original image based on said image processing conditions; displaying each processed image on a display; subjecting the displayed image to image verification in the reverse order to the image reading order of the pre-scanning; and scanning said original in a reverse direction to the direction of the pre-scanning to perform main scanning for image reading to obtain an output image in accordance with an indication given as a result of the image verification.

Preferably, said image verification and main scanning are performed for every group having a preset number of frames.

Preferably, the processed image for the image verification is displayed on the display in order and at an interval of the frame in which the image processing conditions are set up.

Preferably, displaying the processed images for image verification is performed at an interval which is the preset number of frame in which the image processing conditions are set up.

Preferably, the image verification is performed in order and in accordance with displaying the processed image for the image verification.

Preferably, the image reading method further comprises steps of pre-processing the read original images by pre-scanning for displaying, and displaying the pre-processed images of the frame on the display to confirm a position and a format of each frame before displaying the processed image on the display.

Preferably, image processing conditions of the original image of the frame are set up by taking the images of all frames into consideration.

BRIEF DESCRIPTION OF DRAWINGS

The present invention will be explained in more detail in the following with reference to the drawings in which:

FIG. 2b is a schematic side view thereof of FIG. 2a;

DETAILED DESCRIPTION OF THE INVENTION

A detailed description will subsequently be given of the preferred embodiment of an image reading method according to the present invention with reference to the accompanying drawings.

Figure 1:
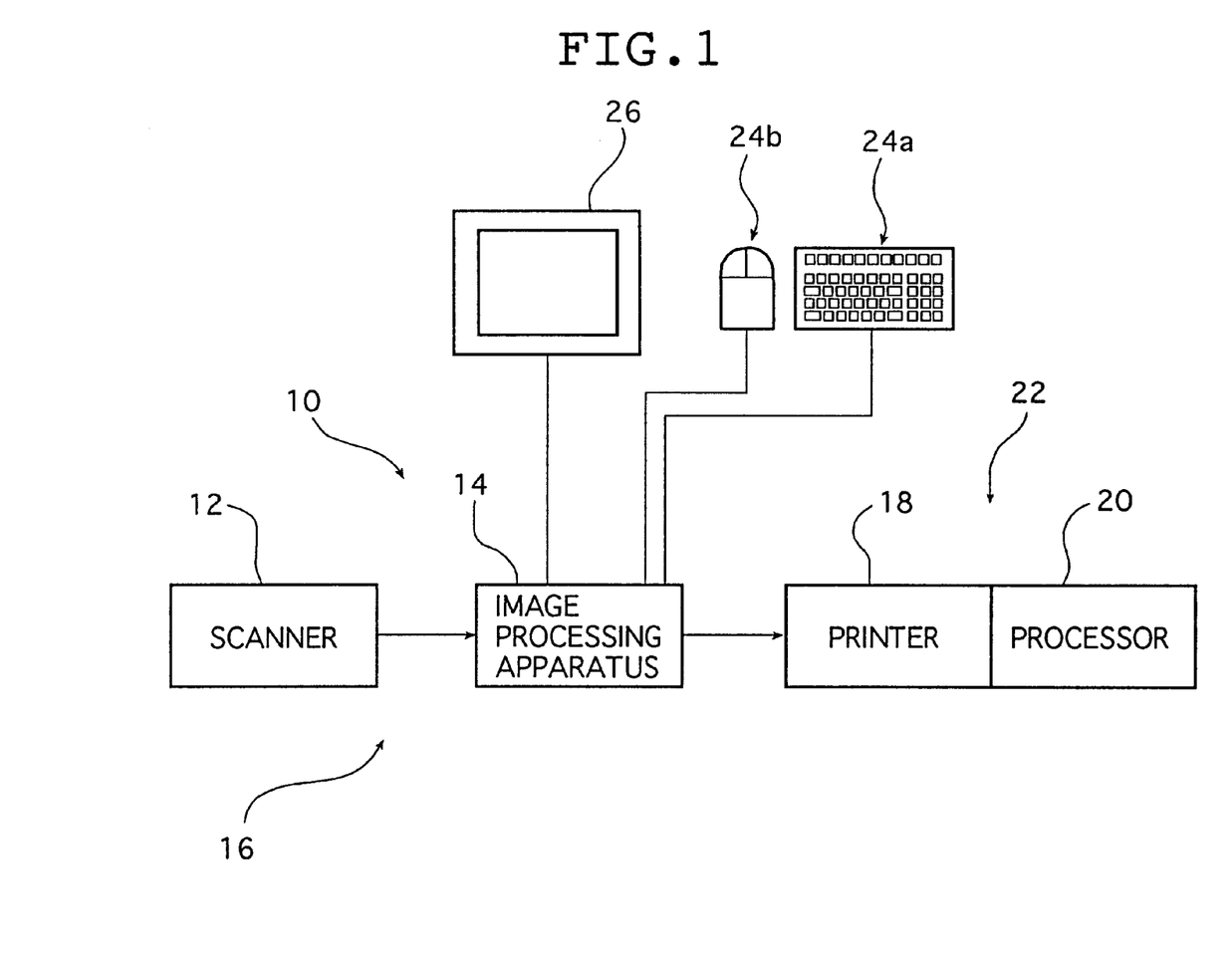
FIG. 1 is a block diagram showing an embodiment of photograph printing and developing machine and embodying an image reading apparatus according to the present invention.

FIG. 1 is a block diagram showing a photograph printing and developing machine embodying an image reading method according to the present invention.

A photograph printing and developing machine 10 shown in FIG. 1 is the aforementioned digital photoprinter and includes an input apparatus 16 having a scanner 12 for reading an image photographed on a film F photoelectrically and an image-processing apparatus 14 for processing an image data read by the scanner 12 with given conditions to obtain an image data for outputting, and an output apparatus 22 having a printer 18 for recording a latent image by subjecting a photosensitive material (photographic paper) to scanning exposure with a light beam which is modulated according to the image data outputted from the image-processing apparatus 14 and a processor 20 for subjecting the exposed photosensitive material to a wet developing and a drying processings in order to output a (finished) print. The input apparatus 16 embodies an image reading method (hereinafter called reading method) according to the present invention.

Moreover, a keyboard 24a and a mouse 24b for entering (setting) various conditions, selection and indication of processings, indication of color and density correction and the like and a display 26 for showing the image read by the scanner 12, indication of various operations, a screen for and/or registering setting of various conditions and the like are connected to the image-processing apparatus 14.

Figure 2A:
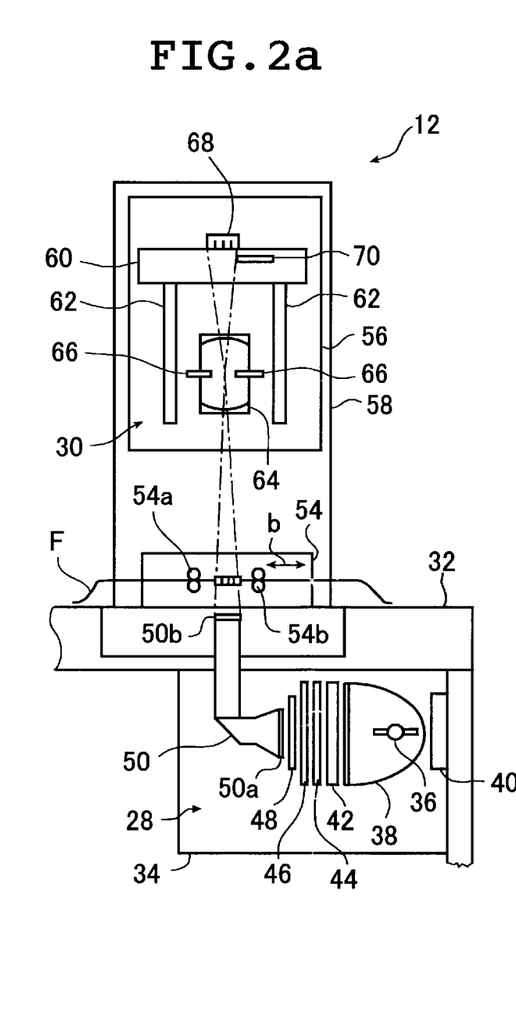
FIG. 2a is a schematic elevational view showing a scanner of the photograph printing and developing machine shown in FIG. 1.
Figure 2B:
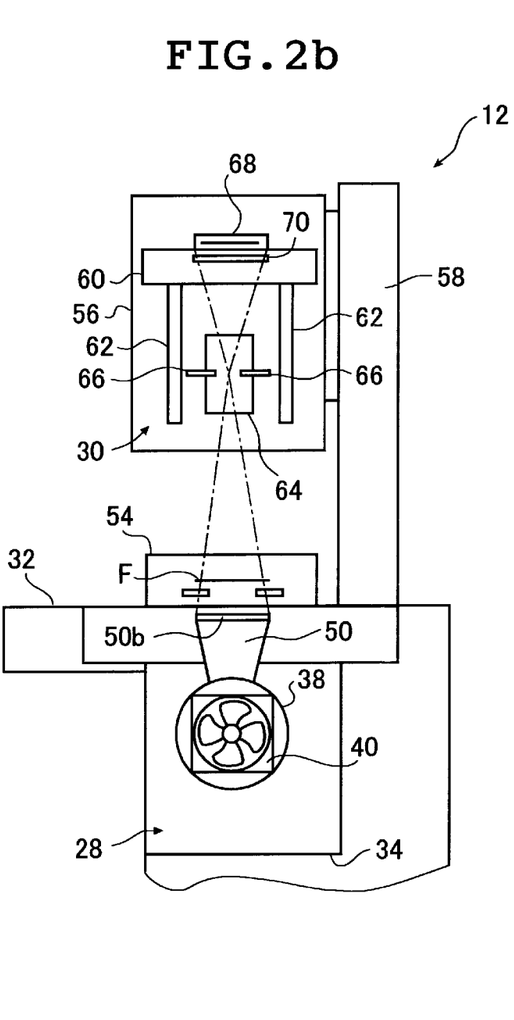

FIGS. 2a and 2b are schematic diagrams showing the scanner 12. FIG. 2a is an elevational view of the scanner 12, whereas FIG. 2b is a right side view thereof.

The scanner 12 includes a light source section 28 and a read section 30.

The light source section 28 is contained in a casing 34 under a work table 32 of the scanner 12 (input apparatus 16). A read light source 36 is disposed on the right side (viewed in FIG. 2a) in the casing 34. As the light source 36, various light sources, such as a halogen lamp, a metal halide lamp and the like, which have been utilized for ordinary photo-electric image reading apparatus may be utilized, as long as the light source has a sufficient quantity of light. A reflector 38 may be disposed around the light source 36 to enable light emitted from the light source 36 to be efficiently incident on the film F. A cooling fan 40 for cooling and keeping an interior at a predetermined temperature is also disposed in the casing 34.

Moreover, a UV and IR cut-off filter (ultraviolet light and infrared light cut-off means) 42 for cutting off lights having wavelengths in ultraviolet and infrared zones so as to prevent the temperature of the film F from rising, a first CC filter 44, a second CC filter 46, a variable diaphragm 48 and a light diffusion box 50 are arranged in a downstream direction (hereinafter called downstream) of a path which the light emitted from the light source 36 travels along in the casing 34.

The first and second CC filters 44, 46 are employed to adjust a difference between the scanner 12 by adjusting color components of light (read light) emitted from the light source 36, in order to perform an appropriate image reading.

For example, lights emitted from the light source of the same type do not necessarily have the same color components (light intensity in each band of wavelengths). Some light source, for example, has a high intensity in an R band. Moreover, the image reading is performed by three line CCD sensors in an image sensor 68 of the scanner 12. Each of these line CCD sensors reads a corresponding image of red (R), green (G) or blue (B). Since there is a difference in sensitivity and the like among line CCD sensors from one another which are employed as image sensors 68, an error may appear in a manner such that R output value is higher than its proper value.

The first CC filter 44 and the second CC filter 46 are color filters each having one of R, G and, B colors (but the first CC filter 44 and the second CC filter 46 correspond to different colors), which correct an apparatus error of the scanner 12 originating from an individual error of its component parts by adjusting color components of the read light.

Component parts of the first CC filter 44 and the second CC filter 46 are not necessarily restrictive, but various kinds of component parts which may adjust light intensity of color components of R, G, and B by being disposed in an optical path of the read light are employable. Examples of the CC filters are preferably illustrated with a color filter plate which changes transmittance density gradually or in steps, a turret having a plurality of color filter plates of different density in its through holes in a fixed manner and the like.

The variable diaphragm 48 is used for adjusting the quantity of read light.

Specifically, the variable diaphragm 48 is adjusted to have a stopping value determined in accordance with image reading conditions given for pre-scanning which will be mentioned below, when the pre-scanning is performed. The variable diaphragm 48 is also adjusted to have a stopping value determined with image data obtained from the pre-scanning, when the main scanning is performed so as to obtain an output image.

Figure 3:
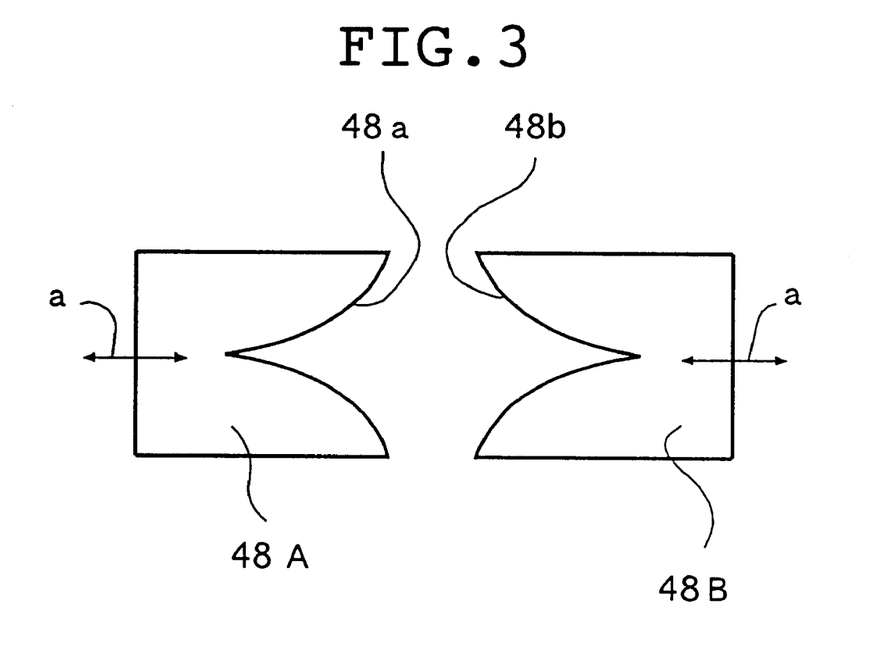
FIG. 3 is a conceptual drawing showing a variable diaphragm disposed in the scanner shown in FIGS. 2a and 2b.

As shown in FIG. 3, the variable diaphragm 48 as an illustrated example consists essentially of two pieces of plate members 48A and 48B. These plate members are disposed on a plane perpendicular to an optical axis facing with each other with the optical axis therebetween. The plate members 48A and 48B are arranged slidably so that they may be brought into contact with each other or separated from each other. Cutouts 48a and 48b are formed in the plate members 48A and 48B respectively in a manner that the areas of the plate members 48A and 48B gradually increase in their sliding directions (directions indicated by a double-headed arrow a) from their facing sides.

Therefore, the quantity of read light passing through the variable diaphragm 48 may be adjusted by separating the plate members 48A and 48B from each other so as to adjust the area of an aperture formed with the cutouts 48a and 48b. In this case, the plate members 48A and 48B are moved by a diaphragm drive motor 86M which will be described below and their positions are sensed by a diaphragm position sensor 86S. Moreover, an adjustment of the quantity of light by the variable diaphragm 48 may be controlled by a known method using, for example, the number of moving pulses of the plate members 48A and 48B.

The light diffusion box 50 is a substantially L-shaped cylindrical body. At two opening ends of the light diffusion box 50, that is, read light incidence and emission ports, light diffusion plates 50a and 50b are each disposed in a manner that they may close surfaces of the opening ends. Moreover, a mirror is provided at a bend for reflecting light to a different direction at an angle 90°. The emission port of the light diffusion box 50 is in a slit form and extends in the same direction as an extending direction of the line CCD sensors (hereinafter called main scanning direction) of the image sensor 68 which will be described below.

Thus, the light incident on the light diffusion box 50 is diffused by the light diffusion plates 50a and 50b and emitted as a slit light extending in the main scanning direction. The length of the slit light is set so that the whole area in the width direction of the film F is satisfactorily irradiated with the light in proportion to the film F of maximum width read by the scanner 12.

As described above, the light source section 28 is located under the work table 32.

The keyboard 24a, the mouse 24b, and the display 26 are each mounted on the surface of the work table 32 in a corresponding position so that the optical system may remain unaffected thereby. A carrier 54 is kept detachable in a predetermined position corresponding to the emission port of the light diffusion box 50.

In the scanner 12, several carriers 54 which are mountable in a predetermined position of the work table 32 are prepared each exclusively for an Advanced Photo System, a negative of 135 in size or a reversal film of various kinds and sizes, and various forms of films such as a strip, a slide and the like so that various films may be dealt with by changing the carriers 54.

The scanner 12 shown in FIGS. 2a and 2b reads the image by means of slit scanning. While held in a predetermined read position corresponding to the emission port of the light diffusion box 50 by the carrier 54, an elongated film F (in a strip form) having a plurality of frames in which images are photographed is scan-transported by a pair of transportation rollers 54a and 54b disposed with the read position placed therebetween in a direction indicated by an arrow b in FIG. 2a (hereinafter called auxiliary-scanning direction). The elongated film F is scan-transported in a direction perpendicular to the main scanning direction and irradiated with the read light from below. Accordingly, projection light carrying an image may be obtained by scanning the film F with the read light two-dimensionally in the scanner 12. Thus, the images in respective frames photographed on the film F are read frame by frame, in order, by the scanner 12 with slit-scanning.

Moreover, the carrier 54 is simultaneously used as a mask for regulating the read light incident on the film F and/or the projection light transmitted through the film F in a predetermined slit form.

A reading apparatus which reads images photoelectrically generally reads images twice per frame: a pre-scanning (pre-reading) which reads images in low resolution to determine image processing conditions and the like; and a main scanning (main-reading) to obtain image data for outputting. The scanner 12 embodying an image reading method according to the present invention pre-scans all frames photographed on the film F, for example, by scan-transporting the film F in the direction indicated by the arrow b. When an examination is performed as the need arises, image processing conditions are first set for every frame in reverse order opposite to the pre-scanning order, and then the verification is performed in the order of automatically setting up the image processing conditions. After the pre-scanning and the verification are finished, the film F is scan-transported in a reverse direction. Thus, the main scanning is performed in reverse order opposite to the pre-scanning order. This will be described in detail below.

As is known in the art, a DX code which indicates sensitivity, the type of film, and a bar code which indicates a frame number and the like are recorded on the film F photoelectrically. A reading means to read this information is arranged in the carrier 54 so that the DX code and the like is read while the film F is scan-transported. The obtained information is sent to the image-processing apparatus 14.

Moreover, a transparent magnetic recording medium which is formed on the film F in the Advanced Photo System records information concerning the type of film F, a cartridge ID and the like. Furthermore, the medium records various items of data including a print size, a photographed date, a photographed time, presence or absence of electronic flashing when a photograph is taken, a developing date and the like, as the occasion demands at the time of photographing, developing, or printing.

A magnetic information reading means is disposed in the carrier corresponding to the Advanced Photo System. When the film is transported to the read position, magnetic information is read and sent to the image-processing apparatus 14.

The read section 30 is contained in a casing 56, and is disposed above the work table 32.

An optical frame 58 is installed on the surface of the work table 32 vertically. The casing 56 is supported by the optical frame 58 displaceably in the direction of bringing the casing 56 into contact with and separating the casing 56 from the work table 32 (i.e., the direction of advancing the focal point of a lens unit 64 and hereinafter called vertical direction). A mounting table 60 is arranged in the casing 56. A plurality of supporting rails 62 are suspended from the mounting table 60. The lens unit 64 is supported by the supporting rails 62 displaceably in a vertical direction.

The lens unit 64 is an image-forming lens unit having a plurality of lenses and used for converting the projection light transmitted through the film F into an image formed on the image sensor 68.

A lens diaphragm 66 is disposed between the lenses of the lens unit 64. The lens diaphragm 66 is, for example, an iris diaphragm and is driven by a lens-diaphragm drive motor 92 which will be described below so that the quantity of projection light which forms the image on the image sensor 68 after passing through the lens diaphragm 66, or the lens unit 64 is adjusted.

The image sensor 68 is mounted on the top surface of the mounting table 60.

The image sensor 68 has three line CCD sensors having electronic shutter mechanisms, as well as a number of CCD cells arranged in rows. Each line CCD sensor extends in the main scanning direction and is spaced apart from one another to the auxiliary-scanning direction. The line CCD sensors are each provided with one of red (R), green (G) and blue (B) color filters (so-called color CCD sensors of three lines) on the light incident side of each line CCD sensor. Moreover, the charge accumulated in each of CCD cells (pixels) of each line CCD sensor is sequentially transferred via the corresponding transfer portion.

Moreover, a shutter 70 is disposed on the upstream side (lower side in FIG. 2a) of the image sensor 68 for the purpose of obtaining data to make a dark correction of the image sensor 68.

Figure 4:
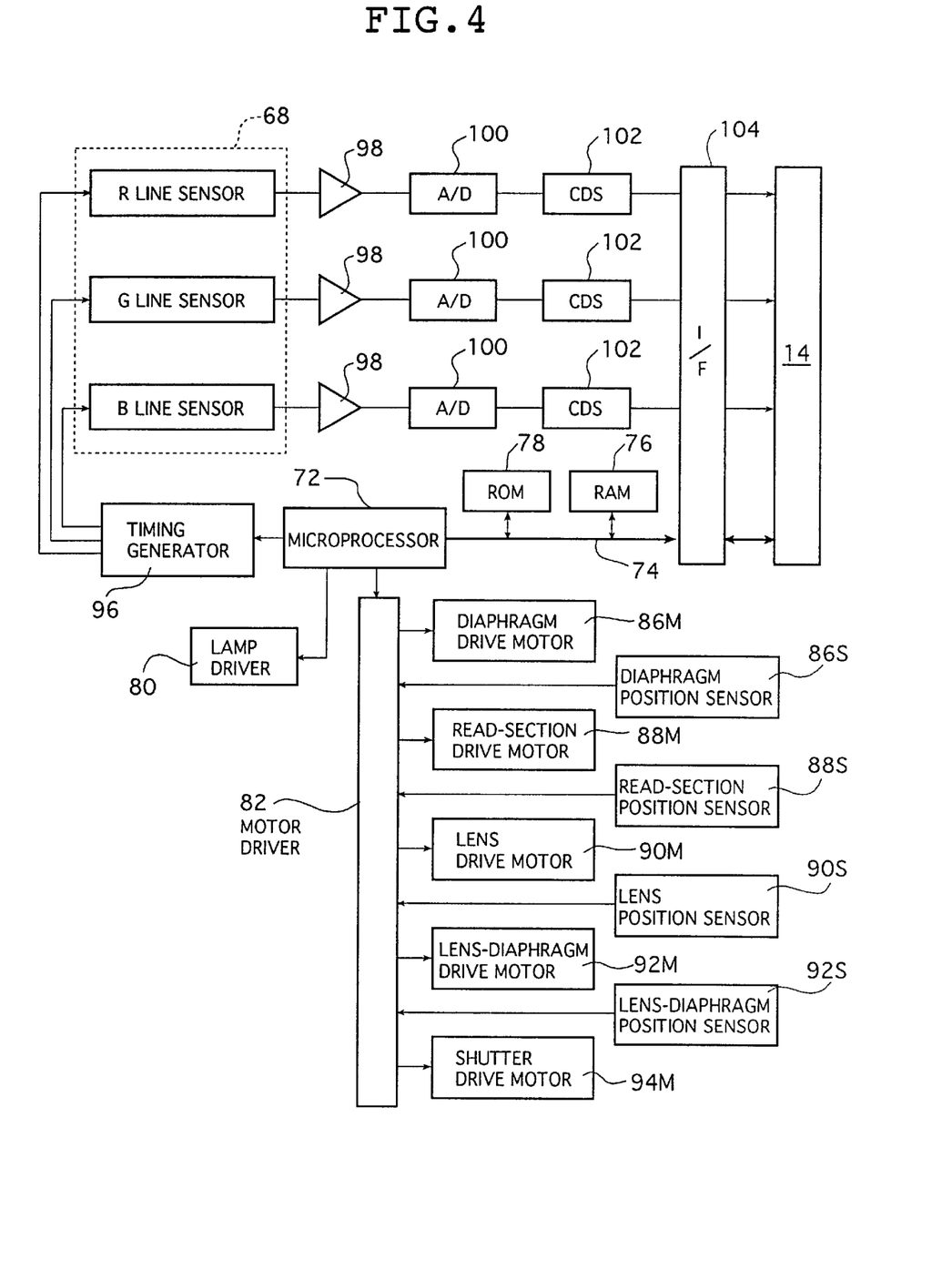
FIG. 4 is a block diagram showing an electrical system of the scanner shown in FIGS. 2a and 2b.

FIG. 4 is a schematic block diagram showing the electrical system of the scanner 12.

The scanner 12 has a microprocessor 72 for controlling the whole scanner 12. The microprocessor 72 is connected with RAM 76 and ROM 78 (e.g., a rewritable ROM), a lamp driver 80, and also a motor driver 82 via a bus 74.

The lamp driver 80 switches the light source 36 on and off according to an indication sent from the microprocessor 72.

On the other hand, the following component parts are connected to the motor driver 82: the diaphragm drive motor 86M for moving the plate members 48A and 48B of the variable diaphragm 48 slidably so as to adjust a stopping value; a diaphragm position sensor 86S for sensing the positions of the plate members 48A and 48B of the variable diaphragm 48 (stopping quantity); a read-section drive motor 88M for moving the casing 56 containing the read section 30 in a vertical direction; a read-section position sensor 88S for sensing the position of the casing 56 (i.e., read section 30); a lens drive motor 90M for moving the lens unit 64 in a vertical direction; a lens position sensor 90S for sensing the position of the lens unit 64; a lens-diaphragm drive motor 92M for adjusting the lens diaphragm 66; a lens-diaphragm position sensor 92S for sensing the position of the lens diaphragm 66 (stopping value); and a shutter drive motor 94M for switching the shutter 70 in a fully closed state or in a fully opened state.

When the image on the film F is read by the image sensor 68, the microprocessor 72 performs light quantity adjustment of the light incident on the film F (density adjustment of the original image) by allowing the diaphragm drive motor 86M to adjust the variable diaphragm 48 according to the position of the variable diaphragm 48 and the predetermined reading conditions.

Moreover, the microprocessor 72 determines a zooming magnification according to the indication of size and variable magnification of the film F. Then, the microprocessor 72 allows the read-section drive motor 88M to move the casing 56 in a vertical direction according to the position of the casing 56 sensed by the read-section position sensor 88S, and also allows the lens drive motor 90M to move the lens unit 64 in a vertical direction according to the position of the lens unit 64 sensed by the lens position sensor 90S, so that the projection light transmitted through the film F may be formed into an image in the image sensor 68 according to the determined zooming magnification.

Furthermore, a timing generator 96 for generating various timing signals (clock signals) which operate the image sensor 68, A/D converters 100 and the like is connected to the image sensor 68. The microprocessor 72 gives an indication to the timing generator 96 according to the predetermined reading conditions, in order to permit each line CCD sensor of the image sensor 68 to read an image by a given accumulated time (electronic shutter). The accumulated time of each line CCD sensor may be individually established and/or controlled according to a color balance of the original image.

Each signal output from the image sensor 68 is amplified by an amplifier 98 before being converted by the A/D converter 100 into digital image data.

The digital image data thus obtained in the A/D converter 100 is processed in a correlated double sampling circuit (CDS) 102 before being sequentially applied to the image-processing apparatus 14 via an interface (I/F) circuit 104. The CDS 102 is used to reduce the image data to image data accurately corresponding to the quantity of accumulated charge in each CCD cell by subtracting field-through data indicating a field-through signal level from the image data.

As photometric signals of R, G and B are outputted from the image sensor 68 in parallel, three signal processing systems each including the amplifier 98, the A/D converter 100 and the CDS 102 are provided. Moreover, image data on R, G and B are outputted in parallel from the I/F circuit 104 as scanning image data.

Figure 5:
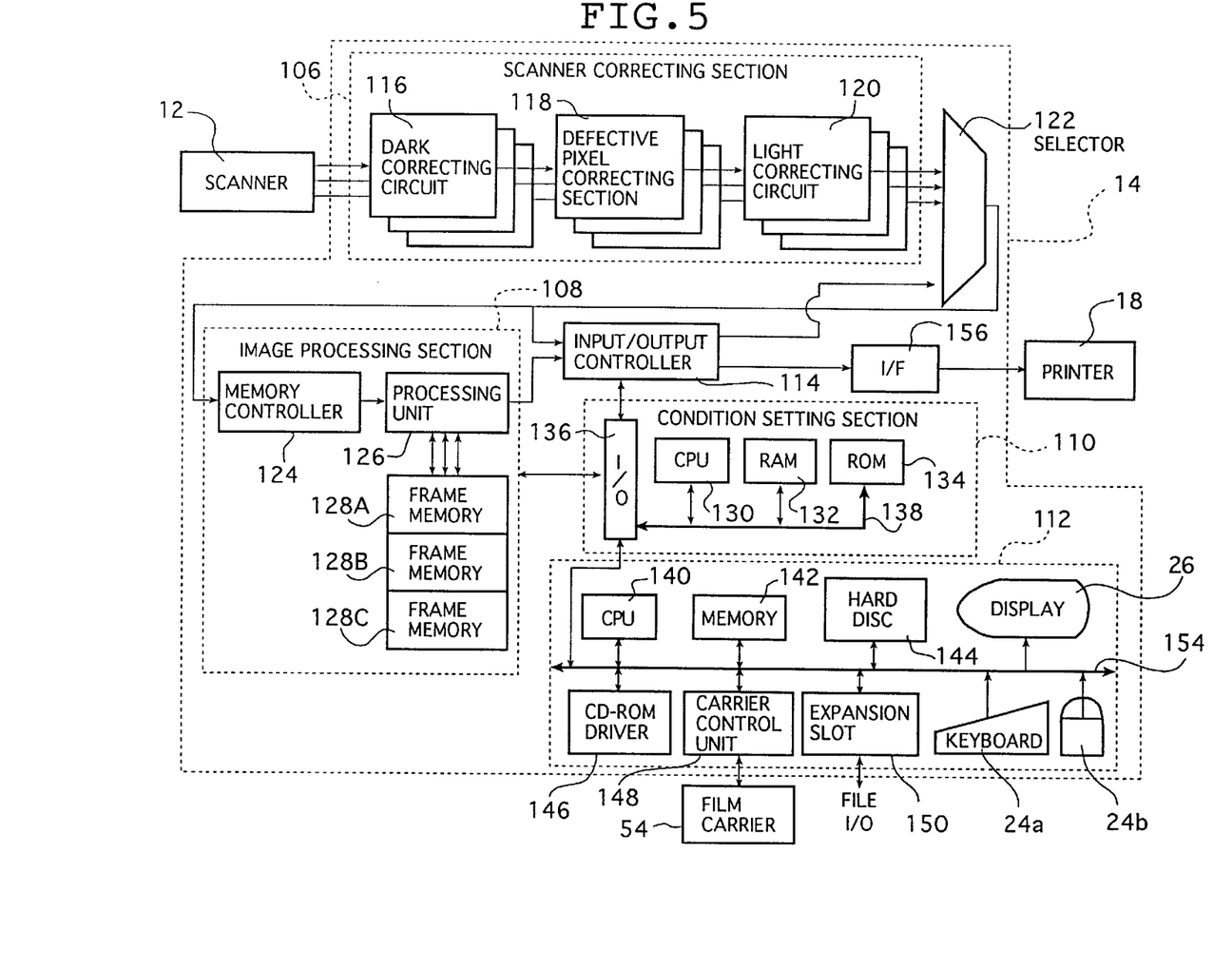
FIG. 5 is a block diagram showing an image reading apparatus of the photograph printing and developing machine shown in FIG. 1.

FIG. 5 is a block diagram showing the image-processing apparatus 14.

The image-processing apparatus 14 includes a scanner correction section 106, an image-processing section 108, a condition-setting section 110, a personal computer 112 and an input-output controller 114.

In the scanner correction section 106, three signal processing systems each including a dark correction circuit 116, a defective pixel correction section 118 and a bright correction circuit 120 are present. The signal processing systems correspond to image data on R, G, B outputted from the scanner 12 in parallel.

The dark correction circuit 116 is employed to correct the dark (current) of the image sensor 68 through the steps of: for example, measuring the image data (data indicating the dark output level of each cell (pixel) of the image sensor 68) outputted from the scanner 12 while the shutter 70 is closed; storing the measured results on a pixel basis; and subtracting the data at the dark output level from the image data on the film F outputted from the scanner 12.

The defective pixel correction section 118 is employed to correct a defective pixel of the image sensor 68 through the steps of: for example, storing the address of the (defective) pixel regarded as being abnormally outputted from the image data on the adjusting film (reference original) read by the scanner 12; and producing image data on the defective pixel by interpolating image data on peripheral pixels out of the image data on the film F outputted from the scanner 12.

The bright correction circuit 120 is employed to correct a variation of each pixel of the image sensor 68 through the steps of: deciding a gain on a pixel basis for correcting the variation of each pixel output using the image data on the adjusting film as described above; and correcting the image data on the film F outputted from the scanner 12 on a pixel basis according to the gain.

Since three line CCD sensors of the image sensor 68 are arranged to be spaced apart from one another in an auxiliary-scanning direction, a time lag in timing exists at which the outputting of the respective image data on R, G and B from the scanner 12 is commenced. In the scanner correction section 106, image-data output timing is delayed at different delay time on a component color basis so that data on R, G and B of the same pixel over the image are outputted simultaneously.

The image data outputted from the scanner correction section 106 is inputted to a selector 122. Since the input terminal of the selector 122 is also connected to the data output terminal of the input-output controller 114, the image data supplied from the outside is inputted to the selector 122 from the input-output controller 114.

The output terminal of the selector 122 is connected to the input-output controller 114 and the image-processing section 108. The selector 122 selectively feeds the supplied image data into the input-output controller 114 and the image-processing section 108.

The image-processing section 108 includes a memory controller 124, a processing unit 126 and three frame memories 128A, 128B and 128C.

Each of the frame memories 128A, 128B and 128C has a storing capacity of image data equivalent to one frame. The image data fed from the selector 122 is processed in the processing unit 126 and sent to the input-output controller 114, or stored in one of three frame memories 128 as the need arises. The memory controller 124 controls addresses when image data is stored in each frame memory 128 so that pixels of the image data thus fed in are stored in such a manner that they are lined up in predetermined order in the storage area of the frame memory 128.

The processing unit 126 allows the main scanning (image) data to be subjected to given image processing, such as, gray (color) balance adjustment, gradation correction, density correction (brightness correction), dodging processing (compression/extension of density dynamic range), color saturation correction, electronic variable magnification processing, sharpness processing and the like in order to create image data for outputting.

These sorts of processing are performed by a known method in which arithmetic operations, processing with LUT (look-up-table), matrix (MTX) operations, processing with filters and the like are properly combined. Processing conditions (setting of operational coefficients, preparation for LUT and MTX operations), together with (image) reading conditions for the main scanning, are set in the condition-setting section 110 as described below.

The processing unit 126 is connected to the input-output controller 114. The image data subjected to image processing is fed into the input-output controller 114 or otherwise fed into the input-output controller 114 at a given timing after being once stored in the frame memory 128.

As described above, reading of an image, i.e., an original image, in each frame photographed on the film F is carried out twice in the apparatus illustrated in the drawing: first by pre-scanning with low resolution; and secondly by main scanning with high resolution.

The pre-scanning is carried out by reading the film F with the pre-scanning reading conditions in which such as the accumulated time of the line CCD sensor, and the stopping value of the variable diaphragm 48 have been set so that the output of the image sensor 68 may not be saturated even when the density of the image photographed on the film F is extremely low (for example, an underexposed negative image).

The image data obtained from this pre-scanning is inputted to the input-output controller 114 from the selector 122 and then supplied from the input-output (I/O) controller 114 to the condition-setting section 110.

The condition-setting section 110 includes CPU 130, RAM 132, ROM 134 (for example, ROM whose storage contents are rewritable) and an input-output (I/O) port 136. These are configured to connect with each other via a bus 138 in a manner so as to extract data in the area corresponding to each frame (image) of the film based on the image data inputted from the I/O controller 114, and then to detect the position of a frame, and finally to set (operate) on a frame basis the image processing conditions and reading conditions at the main scanning.

Specifically, in the condition-setting section 110, preparation of a density histogram and calculation of the quantity of image characteristics including mean density, LATD (Large Area Transmission Density), highlight (lowest density), shadow (highest density) and the like are carried out frame by frame with respect to the pre-scanned data.

From these results and the film information detected from the DX code and the like which are read by the carrier 54, conditions of an original image are judged. Then, the accumulated time of each line CCD sensor of the image sensor 68, and the stopping value of the variable diaphragm 48 are calculated so as to allow the output from image sensor 68 to be saturated at a little lower density than the lowest density of original image. These calculated values are set as the reading conditions of the main scanning. A color balance of image data (original image) may be adjusted according to the accumulated time of each line CCD sensor.

Moreover, the condition-setting section 110 sets image processing conditions (hereinafter called processing conditions) of each frame such as the aforesaid gray balance adjustment, brightness correction according to a density histogram, the quantity of image characteristics, film information and the like, as well as an indication of an operator employing the keyboard 24a and/or the mouse 24b, as the need arises.

The input apparatus 16 embodying an image reading method according to the present invention set process conditions and reading conditions of each frame in reverse order opposite to pre-scanning order, after all frames have been pre-scanned. Accordingly, process conditions may be set taking into consideration pre-scanned data not only of a specific frame, but also of all frames so that process conditions may first be set based on a correct understanding of density and the like of the film F, and then a proper process conditions may be set according to an original image. As a result, an output image of high quality may be obtained by these newly-set process conditions.

In the case of the verification of the image of a frame on a film, the condition-setting section 110 first sets up the processing conditions and reading conditions, and then outputs the thus set processing conditions and the pre-scanned image data into a personal computer (PC) 112. The image in this case is displayed on the display 26 connected to the PC 112 as a simulation image.

Moreover, according to the present invention, the display and the verification of the simulation image are preferably performed of a unit including a predetermined number of frames in reverse order opposite to pre-scanning order.

When the processing conditions are finalized, the condition-setting section 110 supplies the final processing conditions to the processing unit 126 of the image-processing section 108 and also supplies the position and reading conditions of each detected frame to the microprocessor 72 of the scanner 12.

The microprocessor 72 adjusts the accumulated time of each line CCD sensor and/or the stopping value of the variable diaphragm 46 according to the supplied frame-to-frame reading conditions, and reads the image according to the supplied information concerning the position of each frame. Moreover, as described above, a transportation direction of the film F at the main scanning is a reverse direction of pre-scanning so that image reading of each frame at the main scanning is performed in reverse order opposite to pre-scanning order of pre-scanning.

The personal computer 112 (hereinafter called PC 112) includes central processing unit (CPU) 140, a memory 142, a hard disc 144, a CD-ROM driver 146, a carrier control unit 148 and an expansion slot 150. These are connected to one another via a bus 154. The aforesaid keyboard 24a and the mouse 24b are also connected to the bus 154.

The carrier control unit 148 is connected to the carrier 54 and used to control the transportation of the film F by the carrier 54. The DX code and magnetic information and the like of the film F read by the carrier 54 are supplied from the carrier control unit 148 to at least one of the given units, sections and apparatus.

Moreover, a driver (not shown)for reading and/or writing data from and/or to a storing medium such as a memory card, a unit, apparatus, or the like for communicating with other information processing equipment are connected to the PC 112 via the expansion slot 150.

When the verification is performed as described above, the Pre-scanned data and the determined processing conditions are outputted to the PC 112, as the condition-setting section 110 sets the processing conditions. The PC 112 first processes the pre-scanned data of each frame according to the corresponding processing conditions and then displays the processed pre-scanned data on the display 26 as a simulation image.

On the other hand, when the examination is performed by an operator, indications of image adjustments are chiefly inputted using adjustment keys of the keyboard 24a, for example, a density adjustment key, a color adjustment key, a γ (gradation) adjustment key, a sharpness adjustment key and the like. While the PC 112 first adjusts (changes) the processing conditions according to these adjustment indications and then changes the simulation image on the display 26 according to the changed processing conditions. Moreover, the PC 112 supplies information on the indications of the image adjustments to the condition-setting section 110. The condition-setting section 110 adjusts the processing conditions according to this information on the adjustment indications.

The input-output controller 114 is connected to the printer 18 via an I/F circuit 156.

When the image data subjected to image processing is used for image recording on the photosensitive material in the printer 18, the image data for outputting subjected to the image processing in the image-processing section 108 is supplied to the printer 18 as output image data from the input-output controller 114 via the I/F circuit 156. Moreover, when the image data is outputted outside as an image file, the image data subjected to the image processing in the image-processing section 108 is supplied to the PC 112 from the input-output controller 114 via the condition-setting section 110.

The output apparatus 22 which includes the printer 18 and the processor 20 records a latent image by exposing photosensitive material (photographic paper) to light according to the image data outputted from the image-processing apparatus 14 (input apparatus 16) and outputs a (finished) print by subjecting the latent image to predetermined developing processing.

The printer 18 is used, for example, to record the latent image by subjecting photosensitive material in the form of a cut sheet to a light beam scanning exposure. This is done by following the steps of cutting the photosensitive material in lengths for preparing prints, recording back prints, modulating light beams of three kinds for R, G and B exposures corresponding to the spectral sensitivity characteristics of the photosensitive material according to image data (recording image) so that the beams may be deflected in the main scanning direction, transporting the photosensitive material in a auxiliary-scanning direction perpendicular to the main scanning direction in order to record the latent image by subjecting the photosensitive material to two-dimensional scanning exposure using the light beams, and sending the exposed photosensitive material to the processor 20.

In the processor 20, predetermined wet developing processing including coloring development, bleach-fixation, washing and the like is applied to the supplied photosensitive material in order to convert the latent image to a visible image, which is subsequently dried to make a print, and then the prints are sorted out and stacked up by lot, such as a lot being equivalent to a roll of film.

A detailed description will subsequently be given of the image read method according to the present invention by explaining the function of the photograph printing and developing machine 10 with reference to FIG. 2(a).

After the photograph printing and developing machine 10 is actuated and the carrier 54 corresponding to the film F to be read is mounted in a predetermined position on the work table 32 by an operator, the operator makes sure that light quantity of the light source 36 and the like of the input apparatus 16 is in the predetermined condition and, for example, mounts the film F (cartridge in the case of the Advanced Photo System) for use in making prints in the predetermined position on the carrier 54.

When the input apparatus 16 is in the predetermined condition for making prints and the carrier 54 confirms the film F being mounted on, the scanner 12 enters a pre-scanning state in which the stopping value of the variable diaphragm 48 and the accumulated time of each line CCD sensor of the image sensor 68 are set according to the predetermined pre-scanning reading state by the microprocessor 72.

Simultaneously, the casing 44 and the lens unit 64 are vertically moved according to the kind of film F and the print size and the like so as to adjust the magnification and the like.

When the scanner 12 reaches a state corresponding to pre-scanning, then the carrier 54 starts scan-transporting the film F at an pre-scanning speed in the auxiliary-scanning direction (in the direction the arrow b directs), and the read light which is emitted from the light source 36, adjusted by the variable diaphragm 48 and diffused by the light diffusion box 50 is incident on the film F positioned in the predetermined position by the carrier 54. Then the projection light is formed into an image in the image sensor 68 by the lens unit 64 and the image is photoelectrically read by each of the line CCD sensors of R, G and B. As described above, the read light is in the form of slit light extending in the main scanning direction and, since the film F is transported in the auxiliary-scanning direction coinciding with the longitudinal direction perpendicular to the main scanning direction, the film F is two-dimensionally scanned by the slit light.

The reading method according to the present invention is to pre-scan all frames at first. In the illustrated example, the film F is continuously transported and is pre-scanned until all frames from the first frame to the 24th frame are read through.

Moreover, the DX code and the like recorded on the film F are read by the carrier 54 at the same time when the pre-scanning is performed, and, in the case of Advanced Photo System, magnetic information recorded on the film F are read. The read information is sent to the processing apparatus 14 in an appropriate time and is detected as film information on the film kind, the frame number and the like.

Furthermore, in the illustrated example, the film information are detected twice, i.e., during and after the pre-scanning. However, the present invention is not limited to the above detection method. The film information may be once detected either during or after the pre-scanning, or at the beginning of the pre-scanning.

The output signal of the image sensor 68 is amplified by the amplifier 98, converted by the A/D converter 100 into digital image data, corrected by the CDS 102, and sent to the image-processing apparatus 14 from the I/F circuit 104 as the pre-scanned data.

After the pre-scanned data sent to the image-processing apparatus 14 is subjected to dark correction, defective pixel correction and bright correction in the scanner correction section 106, the pre-scanned data is outputted into the input-output (I/O) controller 114 by the selector 122 and then sent to the condition-setting section 110.

In the condition-setting section 110, the pre-scanned data and the film information are utilized so as to extract the pre-scanned data and the position of each frame, to prepare the density histogram frame by frame, and to calculate the quantity of image characteristics on a frame basis. As described above, the reading and the processing conditions of each frame are set up automatically.

The reading and the processing conditions are set up in reverse order opposite to pre-scanning order of pre-scanning, i.e., in order of frames from the 24th frame to the first frame consecutively.

When the verification is performed by the operator, the pre-scanned data, along with its processing conditions, is sent to the PC 112 consecutively.

In the PC 112, the received pre-scanned data is processed according to the corresponding processing conditions, and when a processed image of each frame is consecutively displayed on the display 26 as a simulation image which reproduces a print.

In the input apparatus 16 as an illustrated example, the verification and the main scanning and the like are performed by a group of 6 frames. Simulation images in frames from the 24th frame to the 19th frame are first shown on the display 26, and simulation images in other frames are shown in the same manner consecutively.

Moreover, in the reading method according to the present invention, the number of frames to be read is not limited to 6. It may be determined properly according to the size and resolution and the like of the display 26.

Furthermore, since the number of the frames may be determined according to the kind of the film (for example, normal film, Advanced Photo System and the like), the operator may be provided with capability to properly select the number of the frames within a predetermined range. Therefore, the number of frames of the last group of a film F may be altered according to the number of frames photographed, for example, by increasing a frame only in the last group. In another case, scene information may be utilized so that, if the next frame which is not displayed has the same scene as that in the last frame, the next frame only may be added to the simulation images to be displayed.

The operator verifies the images of frames starting from the 24th frame in reverse order while looking at the simulation image displayed on the display 26. The operator may perform an image adjustment frame by frame using adjusting keys and the like of the keyboard 24a, as the occasion demands. Accordingly, the previously set processing conditions are adjusted (corrected) and simultaneously the simulation image displayed on the display 26 is also varied.

When the operator judges that the image of the specified frame is appropriate (verification OK), then the operator indicates the termination of verifying the image of the frame and moves on to the image verification of the next frame.

When the verification of images of frames from the 24th frame to the 19th frame is terminated following the same verification procedure as above, the operator indicates commencement of a printing operation. This enables the processing conditions of these 6 frames to be established. Then, the position and the processing conditions of each frame are sent to the processing unit 126 of the image-processing section 108, while the reading conditions of each frame are sent to the microprocessor 72 of the scanner 12.

Subsequently, in the scanner 12, the carrier 54 starts transporting the film F in reverse direction of pre-scanning at a speed corresponding to the main scanning so that the main scanning may be performed on the frames from the 24th frame to the 19th frame. It is needless to say that the main scanning is performed according to the reading conditions set up for each frame.

On the other hand, the moment the commencement of the printing is indicated, the simulation images of the frames from the 18th frame to the 13th frame are displayed on the display 26 consecutively according to the processing conditions set up by the condition-setting section 110. The operator starts the verification of the images of the frames from the 18th frame in the same way as that described above. When the operator has finished the verification of the images of the 13th frame, the operator indicates the commencement of printing of these 6 frames from the 18th frame to the 13th frame. In accordance with this indication, the processing conditions, along with the established reading conditions, are sent to the predetermined sites, then the main scanning is performed. Following the same procedure as described above, the verification and the main scanning of images of remaining frames are performed first from the 12th frame to the 7th frame, and then from the 6th frame to the first frame in order. Consequently, image reading of the film F is terminated.

In order to reproduce an image of good quality, it is necessary to increase the pixel density to be read. To meet this necessity, scan-transportation speed of the film F at the time of the main scanning is lowered to some extent. Thus, according to the study of inventors of the present invention, the main scanning generally uses longer time than setting of processing conditions and the like, display, verification and the like of a simulation image use on a frame basis. Therefore, as long as setting changes such as a print size change and the like are not required, the film F may generally be transported continuously from the 24th frame until the first frame in the main scanning, since the verification precedes the main scanning.

As is apparent from the above, according to the reading method of the present invention, every process of pre-scanning, verification, and main scanning may be performed in good efficiency by scan-transporting the film F to-and-fro one time. This enables preparation of prints with a high productivity. Especially, according to the above embodiment, start-up time for verification may be shortened, since a simulation image is immediately displayed in accordance with the setting values of processing conditions. Moreover, as described above, the main scanning generally takes longer time than the verification so that it may not affect the productivity (capacity of the input apparatus), even if the verification is performed in a relatively slow speed.

Furthermore, since the processing conditions of each frame can be set up employing the pre-scanned data of all frames, more appropriate processing conditions are set up to allow an image of high quality to be outputted.

In the input apparatus 16 which performs the reading method according to the present invention, it is not necessarily restrictive that the operator performs a verification but making a print without a verification may be allowed. In this case, the processing conditions are established at a point of time when the condition-setting section 110 has established the processing conditions and the reading conditions at the main scanning. For example, the main scanning is started from the 24th frame at a point of time when the processing conditions and reading conditions of the predetermined number of frames are set up.

When the verification is not performed, moreover, the simulation image may not be displayed on the display 26.

Whether the verification is performed or not may preferably be made selectable as a working mode.

In the above exemplary embodiment, the main scanning of all frames has been performed, for example, by a simultaneous printing. When a print or prints of an image or images in frame(s) of part of the film F (negative piece) are prepared so as to make copies and the like, all frames, for example, are first pre-scanned, and then the predetermined number of frames as a group, for example, 6 frames per one group, are displayed. The operator indicates the frame to be printed and the number of prints from the frame, and, after the operator performs a verification if the need arises, the main scanning of the indicated frames only may be performed.

Moreover, in the above exemplary embodiment, after the verification of 6 frames are all finished, the main scanning of these 6 frames are performed. Besides the above, though the simulation images are displayed every group having 6 frames or the like, the indication of the verification termination is used as the indication of commencement of printing so that the main scanning may be performed in order frame by frame, or by two frames and more.

In this case, as the verification termination is indicated and the setting-up of processing conditions advances, simulation images may be changed by the next one in order.

In the scanner 12, the main scanning is performed in the same manner as in the pre-scanning, except the read-out pixel density, signal level and the transportation direction of the film F.

The scanned data outputted from the scanner 12 by the main scanning is processed in the scanner correction section 106 and then sent by the selector 122 to the image-processing section 108 in which the processing unit 126 allows the received image data to be subjected to the image processing based on the processing conditions set to correspond to each frame. Output image data resulting from a series of steps as described above is sent to the printer 18 from the input-output controller 114 via the I/F circuit 156.

On receiving the output image data, the printer 18 operates to record the back print and form the latent image by subjecting the photosensitive material to the scanning exposure with the light beam modulated according to the image data, whereby to transport the exposed photosensitive material to the processor 20 as described above.

The exposed photosensitive material transported to the processor 20 is subjected to the predetermined processing including the wet developing processing, drying and the like and outputted as a finished print. Then the finished prints are sorted out and stacked up.

Figure 6A:
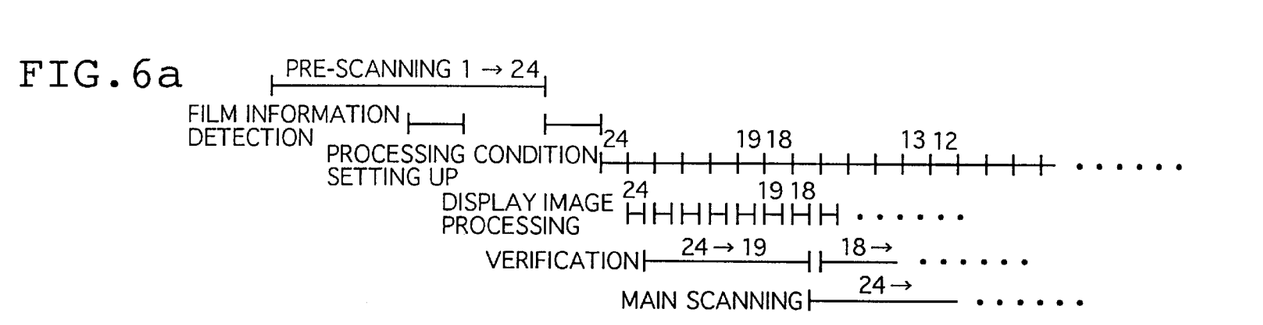
FIGS. 6a, 6b, and 6c are each a conceptual drawing of an embodiment of an image reading method according to the present invention.
Figure 6B:
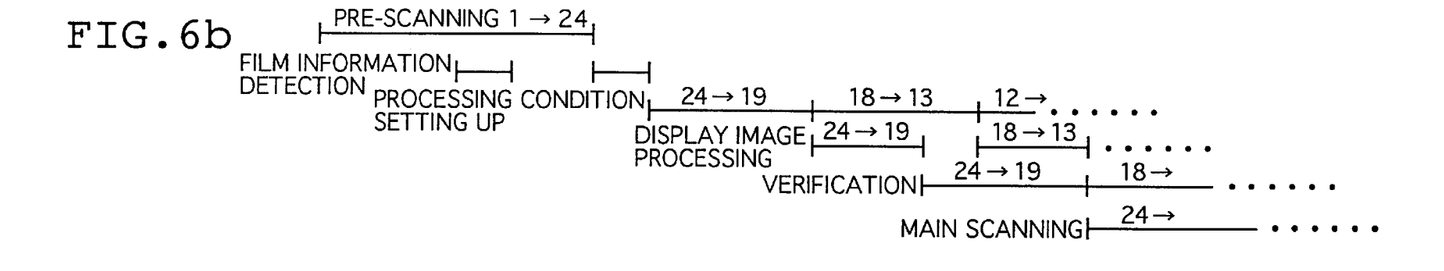

In FIG. 6(b), another embodiment of the reading method according to the present invention is shown.

In the method shown in FIG. 6(a), according to the processing conditions, simulation images are displayed on the display 26 and verified consecutively. On the other hand, in the method shown in FIG. 6(b), after the processing conditions of 6 frames (predetermined number of frames) are set up, simulation images of these 6 frames are displayed and verified consecutively.

In other words, after the pre-scanning of all of the 24 frames are performed, the processing and reading conditions are set up automatically from the 24th frame consecutively. When the processing conditions of frames from the 24th frame to the 19th frame are set up, images of these 6 frames are displayed on the display 26. The operator starts verification from the image of the 24th frame.

After finishing the verification of the first 6 frames, the operator indicates the commencement of printing so as to perform the main scanning of these 6 frames. If the processing conditions of the next 6 frames are determined, the simulation images of these 6 frames are displayed on the display 26 and then verified and finally subjected to the main scanning. Subsequently, images of the frames of the film F are read until the image of the first frame in the same method as described above.

Figure 6C:
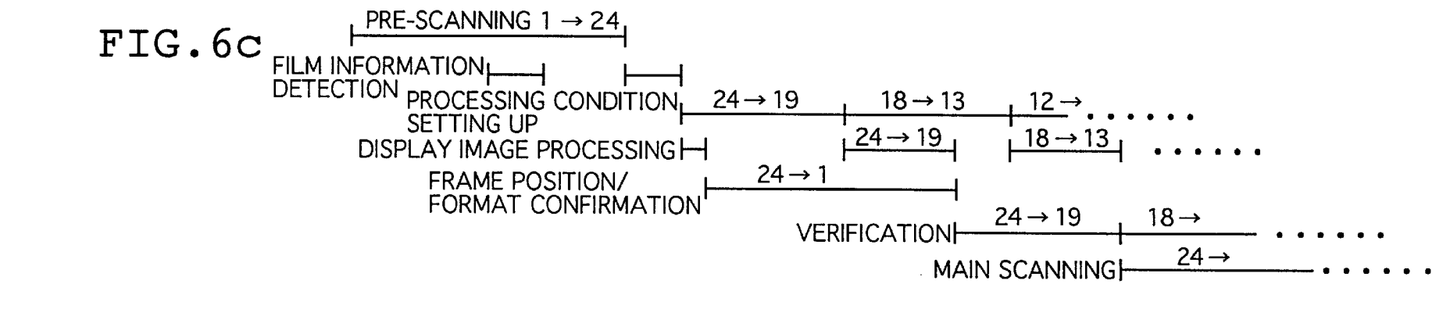

In FIG. 6(c), still another embodiment of the reading method according to the present invention is shown.

In this embodiment, a display for confirming a frame position and/or a format is added to the embodiment of the above described FIG. 6(b).

Namely, after the pre-scanning is finished, an unprocessed pre-scanned data is pre-processed for display, and images of all frames are displayed on the display 26, for example, in black-and-white, while the processing conditions of the first 6 frames are being established. Looking at the displayed images, the operator confirms the position and format of each frame. If the operator finds any improper point, the operator gives an indication to the effect and, for example, the pre-scanning is performed again. If the operator finds no problem, simulation images are displayed according to termination of the set up of the processing conditions of the first 6 frames and then verified and finally images are read by main scanning. Subsequently, the images of the remaining frames are read by main scanning in the same manner as described above so as to read all images in the film F.

The present invention is not limited to the aforesaid embodiment though a detailed description has been given of the image reading apparatus according to the present invention but may needless to say be modified and improved in various manners within the spirit and scope of the present invention.

As set forth above in detail, according to the image reading method of the present invention, each process of pre-scanning, verification, main scanning and the like is capable of being performed with a good efficiency by a one-time to-and-fro scan-transportation of the film F, with regard to readout of the images of a number of frames. Therefore, preparation of prints with a high productivity is capable of being realized by applying the image reading method according to the present invention to a digital photoprinter and the like.

Moreover, since image processing conditions are capable of being set up by taking the pre-scanned data of all frames into consideration, more appropriate image processing conditions are capable of being set up to allow an image of high quality to be outputted constantly with a high productivity.

What is claimed is:

1. An image reading method of reading an original image on a frame wherein original images are recorded in a plurality of frames arranged in a direction, respectively, comprising:

scanning each of the plurality of frames in only said direction of arrangement of said original images to perform pre-scanning for reading each of the original images recorded on said plurality of frames successively;

after the pre-scanning of all of said original images recorded on said plurality of frames, setting up image processing conditions of each read original image in a reverse order to an image reading order of said pre-scanning;

processing each read original image based on said image processing conditions;

displaying each processed image on a display;

subjecting a displayed image to image verification in said reverse order to said image reading order of said pre-scanning; and scanning said each of the plurality of frames in a reverse direction to said direction of said pre-scanning to perform main-scanning for image reading to obtain an output image in accordance with an indication given as a result of the image verification.

2. The image reading method according to claim 1, wherein said image verification and main scanning are performed in groups having a preset number of frames.

3. The image reading method according to claim 2, wherein said processed image for said image verification is displayed on said display in order, at an interval of said preset number of frames in which said image processing conditions are set up.

4. The image reading method according to claim 2, wherein said displaying processed images for image verification is performed at an interval of said preset number of frames in which said image processing conditions are set up.

5. The image reading method according to claim 3, wherein said image verification is performed in order, in accordance with said displaying said processed image for said image verification.

6. The image reading method according to claim 1, further comprising steps of:

pre-processing said read original images by pre-scanning for displaying; and displaying pre-processed images of said frames on said display to confirm a position and a format of each frame before displaying the processed image on the display.

7. The image reading method according to claim 1, wherein said image processing conditions of said original image of said frames are set taking said images of all frames into consideration.

8. The image reading method according to claim 1, wherein said main scanning is performed to obtain image data for said output image.

9. The image reading method according to claim 1, wherein said pre-scanning is performed to obtain pre-scanned data.

10. The image reading method according to claim 9, wherein said main scanning is performed to obtain image data for said output image.

11. The image reading method according to claim 10, wherein said image data for said output image is an image data with a resolution higher than said pre-scanned data.

12. The image reading method according to claim 9, wherein said image processing conditions are set up based on said pre-scanned data.

13. An image reading method of reading an original image from a frame, wherein original images are recorded in a plurality of frames arranged in a frame orientation direction, comprising:

scanning each of the plurality of frames in only said frame orientation direction to perform pre-scanning for reading each of the original images recorded on said plurality of frames successively to obtain pre-scanned data;

after the pre-scanning of all of said original images recorded on said plurality of frames, setting up image processing conditions of each read original image based on said pre-scanned data in a reverse order to an image reading order of said pre-scanning;

processing each read original image based on said image processing conditions;

displaying each processed image on a display;

subjecting a displayed image to image verification in said reverse order to said image reading order of said pre-scanning; and scanning each of the plurality of frames in a reverse direction to said direction of said pre-scanning to perform main-scanning for image reading to obtain image data for an output image with a resolution higher than said pre-scanned data in accordance with an indication given as a result of the image verification.

14. An image reading apparatus for reading an original image on a frame wherein original images are recorded on a plurality of frames in a frame orientation direction, comprising:

a scanner for performing pre-scanning for reading each of the original images recorded on the plurality of frames successively in the frame orientation direction,
wherein image processing conditions are set for each read original image in a reverse order to an image reading order of the pre-scanning;

a processor for processing each read original image based on the image processing conditions;

a display for displaying each processed image,
wherein the displayed image is subject to image verification in said reverse order to said image reading order of said pre-scanning and
wherein said scanner scans each of the frames in a reverse direction to said direction of said pre-scanning to perform main-scanning for image reading to obtain an output image in accordance with an indication given as a result of the image verification.

15. The image reading apparatus according to claim 14, wherein said image verification and main scanning are performed in groups having a present number of frames.

16. The image reading apparatus according to claim 15, wherein said processed image for said image verification is displayed on said display in order, at an interval of said preset number of frames in which said image processing conditions are set up.

17. The image reading apparatus according to claim 15, wherein said display for displaying processed images for image verification is performed at an interval of said preset number of frames in which said image processing conditions are set up.

18. The image reading apparatus according to claim 16, wherein said image verification is performed in order, in accordance with said displaying said processed image for said image verification.

19. The image reading apparatus according to claim 14, wherein said original images are pre-processed by pre-scanning said original images for displaying, and wherein said display displays the pre-processed images of said frames to confirm a position and a format of each frame before displaying the processed image on the display.

20. The image reading apparatus of claim 14, wherein said image processing conditions of said original image of said frames are set taking said images of all frames into consideration.

21. The image reading apparatus according to claim 14, wherein said main scanning is performed to obtain image data for said output image.

22. The image reading apparatus according to claim 14, wherein said pre-scanning is performed to obtain pre-scanned data.

23. The image reading apparatus according to claim 22, wherein said main scanning is performed to obtain image data for said output image.

24. The image reading apparatus according to claim 23, wherein said image data for said output image is an image data with a resolution higher than said pre-scanned data.

25. The image reading apparatus according to claim 22, wherein said image processing conditions are set up based on said pre-scanned data.

26. An image reading apparatus for reading an original image from a frame, wherein original images are recorded in a plurality of frames arranged in a frame orientation direction, comprising:

a scanner for scanning each of the plurality of frames in only said frame orientation direction to perform pre-scanning for reading each of the original images recorded on said plurality of frames successively to obtain pre-scanned data,
wherein after the pre-scanning of all of said original images recorded on said plurality of frames, image processing conditions of each read original image are set based on said pre-scanned data in a reverse order to an image reading order of said pre-scanning;

a processor for processing each read original image based on said image processing conditions;

a display for displaying each processed image on a display,
wherein a displayed image is subjected to image verification in said reverse order to said image reading order of said pre-scanning, and
wherein said scanner scans each of the plurality of frames in a reverse direction to said direction of said pre-scanning to perform main-scanning for image reading to obtain image data for an output image with a resolution higher than said pre-scanned data in accordance with an indication given as a result of the image verification.

* * * * *